United States Patent
Sauder et al.

(10) Patent No.: US 12,473,103 B2
(45) Date of Patent: Nov. 18, 2025

(54) UNDER-CONSTRAINED DEPLOYABLE SYSTEMS AND COMPONENTS THEREFOR

(71) Applicant: California Institute of Technology, Pasadena, CA (US)

(72) Inventors: Jonathan Sauder, La Crescenta, CA (US); Nacer E. Chahat, Altadena, CA (US); Juan M. Mejia-Ariza, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 35 days.

(21) Appl. No.: 18/468,611

(22) Filed: Sep. 15, 2023

(65) Prior Publication Data

US 2024/0092509 A1   Mar. 21, 2024

Related U.S. Application Data

(60) Provisional application No. 63/406,904, filed on Sep. 15, 2022.

(51) Int. Cl.
*B64G 4/00* (2006.01)
*B64G 3/00* (2006.01)

(52) U.S. Cl.
CPC .................. *B64G 4/00* (2013.01); *B64G 3/00* (2013.01)

(58) Field of Classification Search
CPC ..................................... B64G 4/00; B64G 3/00
See application file for complete search history.

(56) References Cited

U.S. PATENT DOCUMENTS

| | | | | |
|---|---|---|---|---|
| 4,030,102 A | * | 6/1977 | Kaplan | H01Q 15/161 244/172.6 |
| 12,155,347 B1 | * | 11/2024 | Gibb | B64G 1/2225 |
| 2014/0263847 A1 | * | 9/2014 | Eskenazi | B64G 1/44 244/172.6 |

OTHER PUBLICATIONS

STS-77 Flight Day 2. 2013.
"Achieving Science with CubeSats: Thinking Inside the Box", National Academies of Sciences, Engineering, and Medicine, 2016. (Presented in 2 Parts).
"Thriving on Our Changing Planet: A Decadal Strategy for Earth Observation from Space", The National Academies Press, Washington, DC, 2018. (Presented in 3 Parts).
Agnes et al., "Testing the Deployment Repeatability of a Precision Deployable Boom Prototype for the Proposed SWOT KaRIn Instrument", AIAA 2015-1838, Published Online:Jan. 2, 2015. https://doi.org/10.2514/6.2015-1838.
Bassily et al., "Deployable Reflectors", In Handbook of Reflector Antennas and Feed Systems vol. 3: Applications of Reflectors, Artech House, Boston, Massachusetts, 2013. (Presented in 3 Parts).

(Continued)

*Primary Examiner* — Justin M Benedik
(74) *Attorney, Agent, or Firm* — KPPB LLP

(57) ABSTRACT

A device can be configured as an under-constrained deployable system. Such a system can use under-constrained deployable couplers. A device may include a second segment coupled to the first segment by a high strain structure, wherein the high strain structure is bent to store deployment energy in a stowed configuration. Releasing the stored deployment energy can allow an under-constrained deployable system to transition to an expanded configuration. A tensioning system can transition an under-constrained deployable system to a deployed configuration.

25 Claims, 12 Drawing Sheets

(56) References Cited

OTHER PUBLICATIONS

Berg et al., "Demonstrating the Viability of the Tempest-D Cubesat Radiometer for Science Applications", IGARSS 2019—2019 IEEE International Geoscience and Remote Sensing Symposium, Jul. 28, 2019—Aug. 2, 2019, Yokohama, Japan, doi: 10.1109/IGARSS.2019.8897881.
Dufour et al., "Origami Deployable Reflector Antenna for CubeSats", In AIAA Scitech 2021 Forum, American Institute of Aeronautics and Astronautics.
Ekblaw et al., "Self-Assembling Space Architecture: Tessellated Shell Structures for Space Habitats", AIAA Scitech 2019 Forum, American Institute of Aeronautics and Astronautics. Published Online:Jan. 6, 2019. https://doi.org/10.2514/6.2019-0481.
Entekhabi et al., "The Soil Moisture Active Passive (SMAP) Mission", Proceedings of the IEEE, vol. 98, No. 5, 2010, pp. 704-716. https://doi.org/10.1109/JPROC.2010.2043918.
Haddad et al., "RainCube: a Proposed Constellation of Atmospheric Profiling Radars in Cubesat", Remote Sensing of the Atmosphere, Clouds, and Precipitation VI, May 5, 2016, vol. 9876, pp. 987606.
Lee et al., "Architecture for in-space Robotic Assembly of a Modular Space Telescope", Journal of Astronomical Telescopes, Instruments, and Systems, vol. 2, No. 4, 2016, p. 041207. https://doi.org/10.1117/1.JATIS.2.4.041207.
Monje et al., "A compact W-band breadboard radar for Atmospheric Measurements", 2020 IEEE Radar Conference (RadarConf20), Sep. 21-25, 2020, Florence, Italy, doi: 10.1109/RadarConf2043947.2020.9266363.
Murphey et al., "High Strain Composites", Presented at the 2nd AIAA Spacecraft Structures Conference, Kissimmee, Florida, 2015.
Peral et al., "Raincube: A proposed constellation of precipitation profiling radars in CubeSat", 2015 IEEE International Geoscience and Remote Sensing Symposium (IGARSS), Jul. 26-31, 2015, Milan, Italy, doi: 10.1109/IGARSS.2015.7326003.
Rosen et al., "The NASA-ISRO SAR (NISAR) Mission Dual-Band Radar Instrument Preliminary Design", Presented at the 2017 IEEE International Geoscience and Remote Sensing Symposium (IGARSS), 2017. Doi: 10.1109/IGARSS.2017.8127836.
Skakoon, "Elements of Mechanical Design", ASME Press, 2008.
Zimpfer et al., "Autonomous Rendezvous, Capture and In-Space Assembly: Past, Present and Future", In 1st Space Exploration Conference: Continuing the Voyage of Discovery, American Institute of Aeronautics and Astronautics. Published Online:Dec. 21, 2012. https://doi.org/10.2514/6.2005-2523.
Reising et al., "Overview of Temporal Experiment for Storms and Tropical Systems (TEMPEST) CubeSat Constellation Mission", May 17-22, 2015, IEEE MTT-S International Microwave Symposium, Phoenix, AZ, USA, doi: 10.1109/MWSYM.2015.7167136.
Reynolds et al., "Design and Development of the Primary and Secondary Mirror Deployment Systems for the Cryogenic JWST", Presented at the 37th Aerospace Mechanisms Symposium, Johnson Space Center, May 19-21, 2004.
Stephens et al., "CloudSat and CALIPSO within the A-Train: Ten Years of Actively Observing the Earth System", Bulletin of the American Meteorological Society, vol. 99, No. 3, 2018, pp. 569-581 https://doi.org/10.1175/BAMS-D-16-0324.1.

* cited by examiner

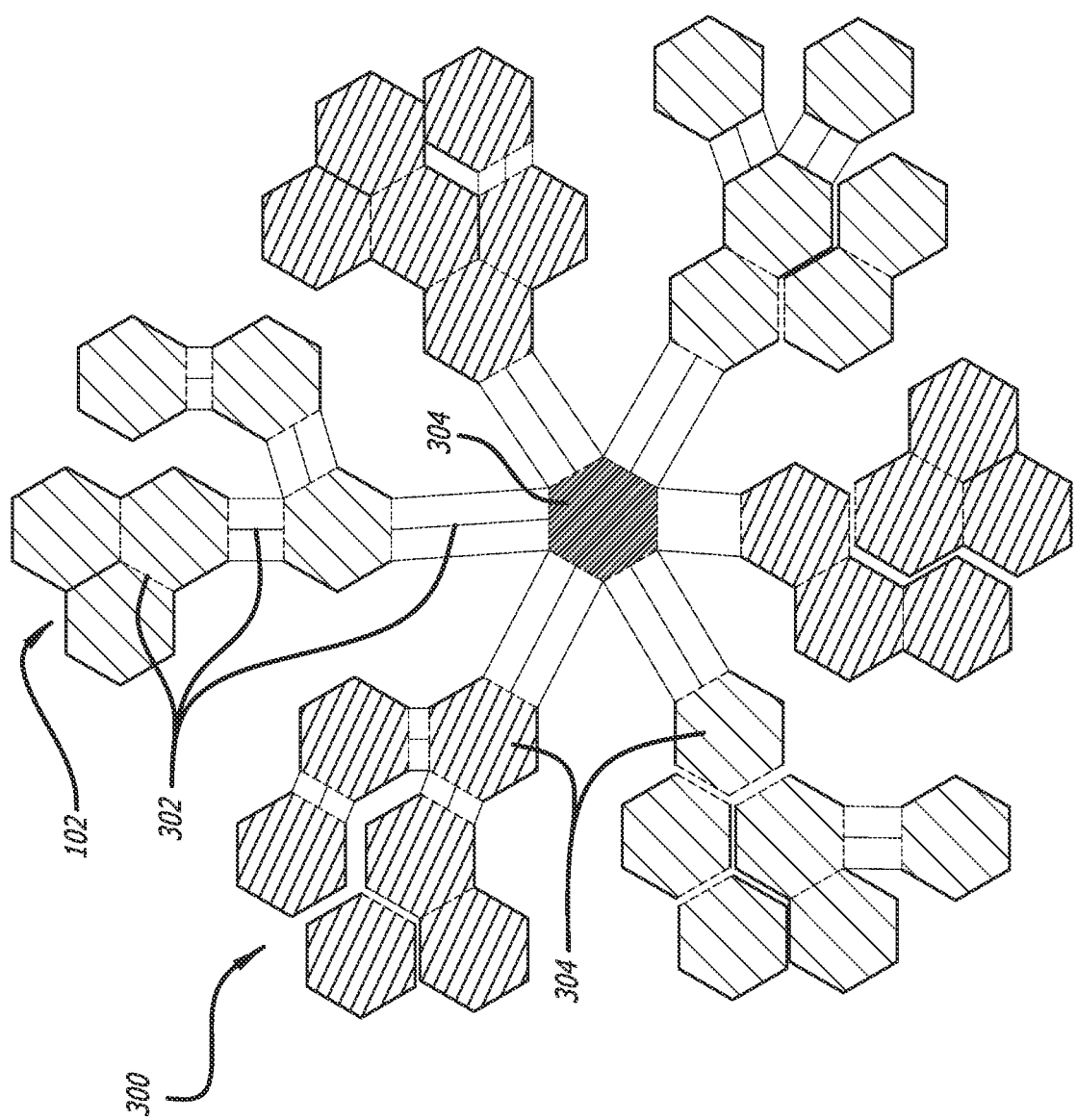

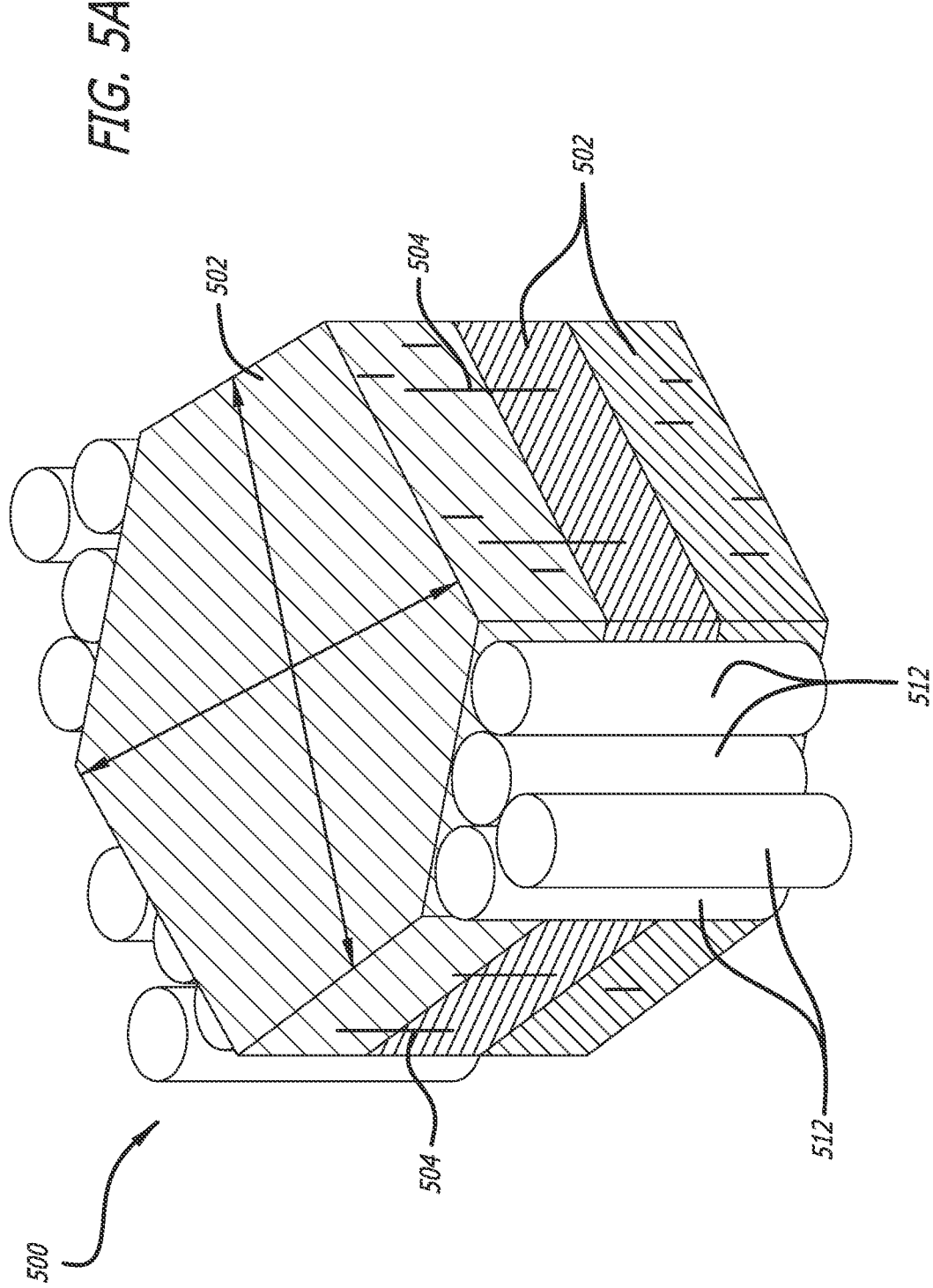

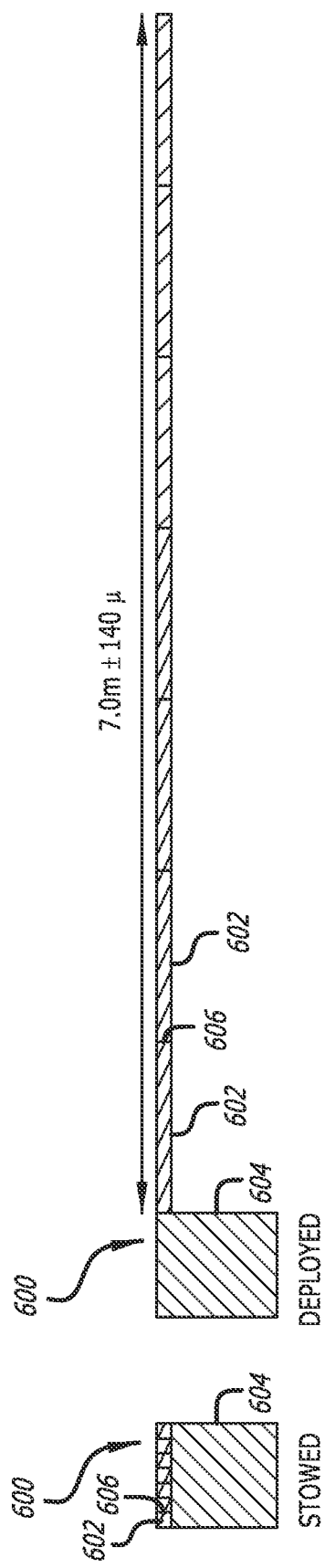

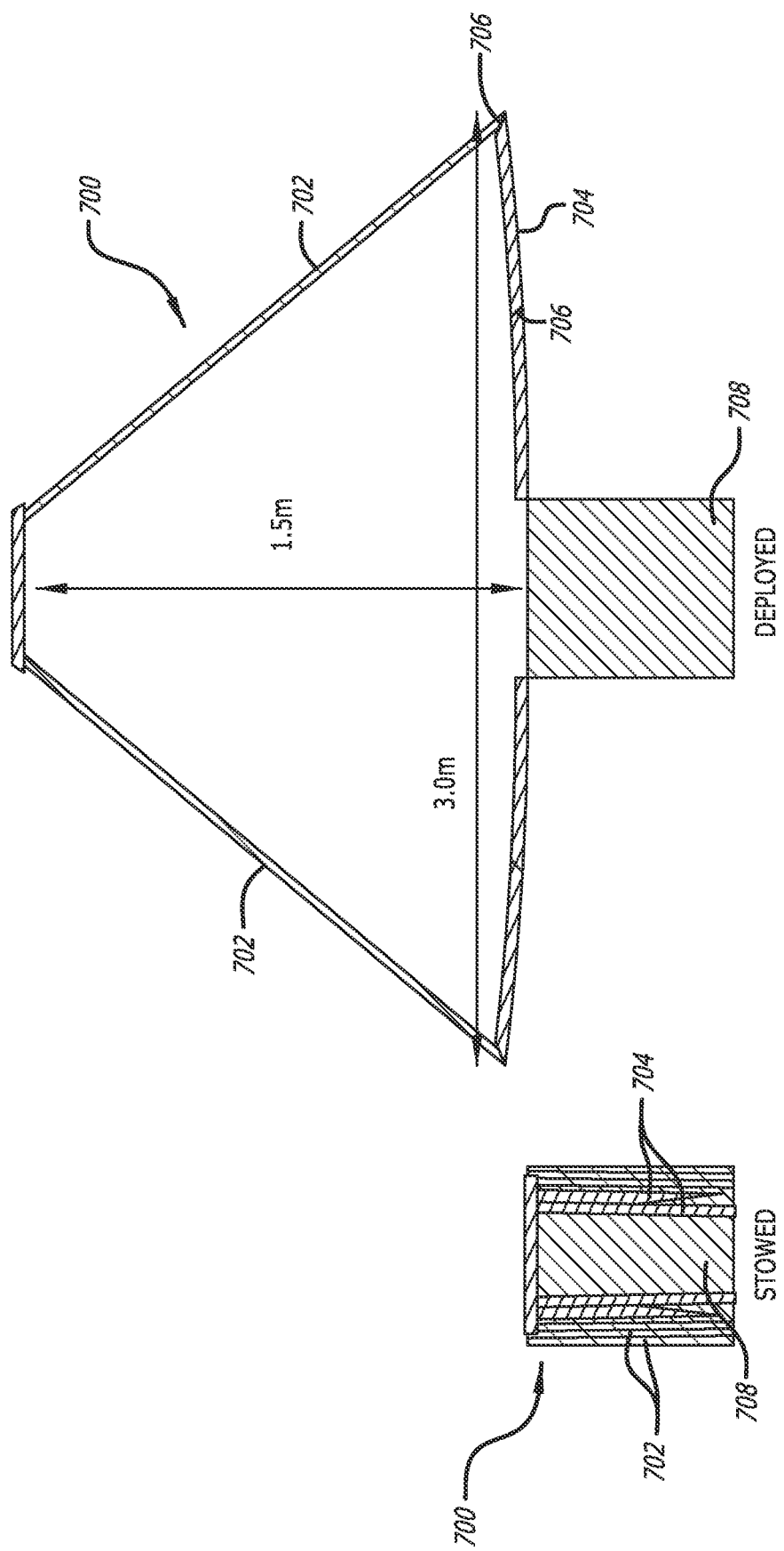

UNDER-CONSTRAINED DEPLOYABLE SYSTEMS AND COMPONENTS THEREFOR

CROSS REFERENCE

The current application claims the benefit of and priority under 35 U.S.C. § 119(e) to U.S. Provisional Patent Application No. 63/406,904 entitled "Starburst: A Revolutionary Under-Constrained Adaptable Deployable Structure Architecture," filed Sep. 15, 2022, the disclosure of which is hereby incorporated by reference in its entirety for all purposes.

GOVERNMENT SUPPORT CLAUSE

This invention was made with government support under Grant No. 80NMO0018D0004 awarded by NASA (JPL). The government has certain rights in the invention.

FIELD OF THE INVENTION

The present invention is generally related to deployable systems. More particularly it is directed to under-constrained deployable systems and components therefor.

BACKGROUND

In legacy systems, in-space assembly can often implement deployable structures by initially stowing the segments in a chassis. After launch the segments can be unstowed and proximated by a robotic arm. Alignment may often be achieved through robotic arm manipulation and/or inherent fully constrained features on each segment. Contact, precise location, and preloading are typically facilitated by fully constrained mechanisms integrated within the segments, and/or actuated by the robotic arm.

In the case of traditional deployables, such as those employing hinges for rigid panel deployment, the system is stowed using launch locks and released using springs or other launch lock release mechanisms. Proximation, alignment, and contact are often facilitated by the hinge actuation method, often involving motors or springs. Due to the hinge connection, the system remains in contact throughout deployment. Precise location can be achieved by the hinge or separate kinematic contacts for enhanced accuracy. Preloading is often accomplished through the hinge actuation mechanism or dedicated latching features.

SUMMARY OF THE INVENTION

Several embodiments can include an under-constrained deployment system for deploying structures in space. In an embodiment, the deployment system includes: a first segment; a second segment coupled to the first segment by a high strain structure, wherein the high strain structure is bent to store deployment energy in a stowed configuration; a tensioning system further coupling the first segment to the second segment, wherein the tensioning systems is capable of actuating to translate the first segment along the high strain structure such that the deployment system is transitioned from an expanded configuration to an assembled configuration; and a locating element; wherein, in the stowed configuration, the first segment and second segment have a first relative position; wherein, in the expanded configuration, the high strain structure is straightened relative to the stowed configuration, and wherein the expanded configuration is achieved using energy released as the high strain structure transitions from bent to straightened, and wherein the first segment and the second segment have a second relative position in the expanded configuration; and wherein the assembled configuration corresponds to the first segment and the second segment having a third relative position, the third relative position constrained by contact between a first portion of the locating element disposed on the first segment and a second portion of locating element disposed on the second segment.

In another embodiment, the locating element is a kinematic coupling.

In yet another embodiment, the high strain structure has an aspect ratio greater than 3.

In another further embodiment, the high strain structure is two high strain rods.

In still another embodiment, a cable is centrally disposed between a first high strain composite rod and a second high strain composite rod.

In another additional embodiment, the locating element provides repeatability within 10 microns.

In another embodiment again, the tensioning system includes a cable.

In still yet another embodiment, the tensioning system is the high strain structure, and wherein the high strain structure can also be retracted to bring the first segment and second segment together.

In still another further embodiment, the under-constrained deployment system further includes a third segment coupled to the first segment by a high strain structure and a cable.

In still another additional embodiment, the first segment is an aperture segment.

In still another embodiment again, the first segment is a boom segment.

Various embodiments can include a solid under-constrained multi-frequency (SUM) deployable antenna. In an embodiment, a SUM deployable antenna can include: a deployable antenna including: a first segment; and a second segment that is coupled to the first segment by an under-constrained deployable coupler, wherein the under-constrained deployable coupler includes: a high strain deformable structure connected on a first end to the first segment, and on a second end to the second segment, wherein when the deployable antenna is in a stowed configuration, strain energy is stored in the high strain deformable structure; a tensioning system; and a kinematic mount with a first side disposed on the first segment and a second side disposed on the second segment; wherein, in a deployed configuration, the deployable antenna has an outer diameter greater than 2 meters.

In yet another further embodiment, the first segment is hexagonal.

In yet another additional embodiment, the high strain deformable structure includes two generally parallel high strain composite rods.

In yet another embodiment again, the high strain deformable structure can translate relative to the first segment and relative to the second segment.

In yet still another further embodiment, the tensioning system includes a cable and a cable tensioning system.

In yet still another embodiment again, the deployable antenna has an outer diameter of around 3 meters.

In yet still another additional embodiment, the stored strain energy is sufficient to transition the deployable antenna from the stowed configuration to an over-expanded configuration.

In another further additional embodiment, the tensioning system is capable of transitioning the antenna from an over-expanded configuration to the deployed configuration.

Many embodiments include an under-constrained deployable coupler. In an embodiment, the deployable coupler includes: a first side with a first passage, a second passage; a second side with a third passage, and a fourth passage; a first high strain rod movably coupled to the first passage and the second passage; a second high strain rod movably coupled to the third passage and the fourth passage; a cable coupled to the first side and the second side; a first portion of a locating element disposed on the first side; and a second portion the locating element disposed on the second side, wherein the first portion of the locating element and the second portion of the locating element are configured to mechanically interface.

In another further embodiment again, the first and second high strain rods are high strain composite rods.

In another additional embodiment again, the first portion of the locating element and the second portion of the locating element are configured to mechanically interface when pre-loaded by the cable.

In yet another additional embodiment again, the first and second high strain rods are substantially parallel.

In yet another further additional embodiment, the first side is disposed on a first segment and the second side is disposed on a second segment, and wherein the first and second segments are configured to form a parabola when the first portion of the locating element and the second portion of the locating element mechanically interface.

In still yet another further embodiment again, the first side is disposed on a first segment and the second side is disposed on a second segment, and wherein the first and second segments are configured to form a boom when the first portion of the locating element and the second portion of the locating element mechanically interface.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIGS. 3A through 3C conceptually illustrate an example of a solid under-constrained multi-frequency (SUM) deployable antenna.

FIGS. 5A through 5C conceptually illustrate another example of a SUM deployable antenna.

FIGS. 6A and 6B conceptually illustrate an example of an under-constrained deployable boom.

FIGS. 7A and 7B conceptually illustrate an example of an under-constrained deployable telescope.

DETAILED DESCRIPTION

Figure 1:
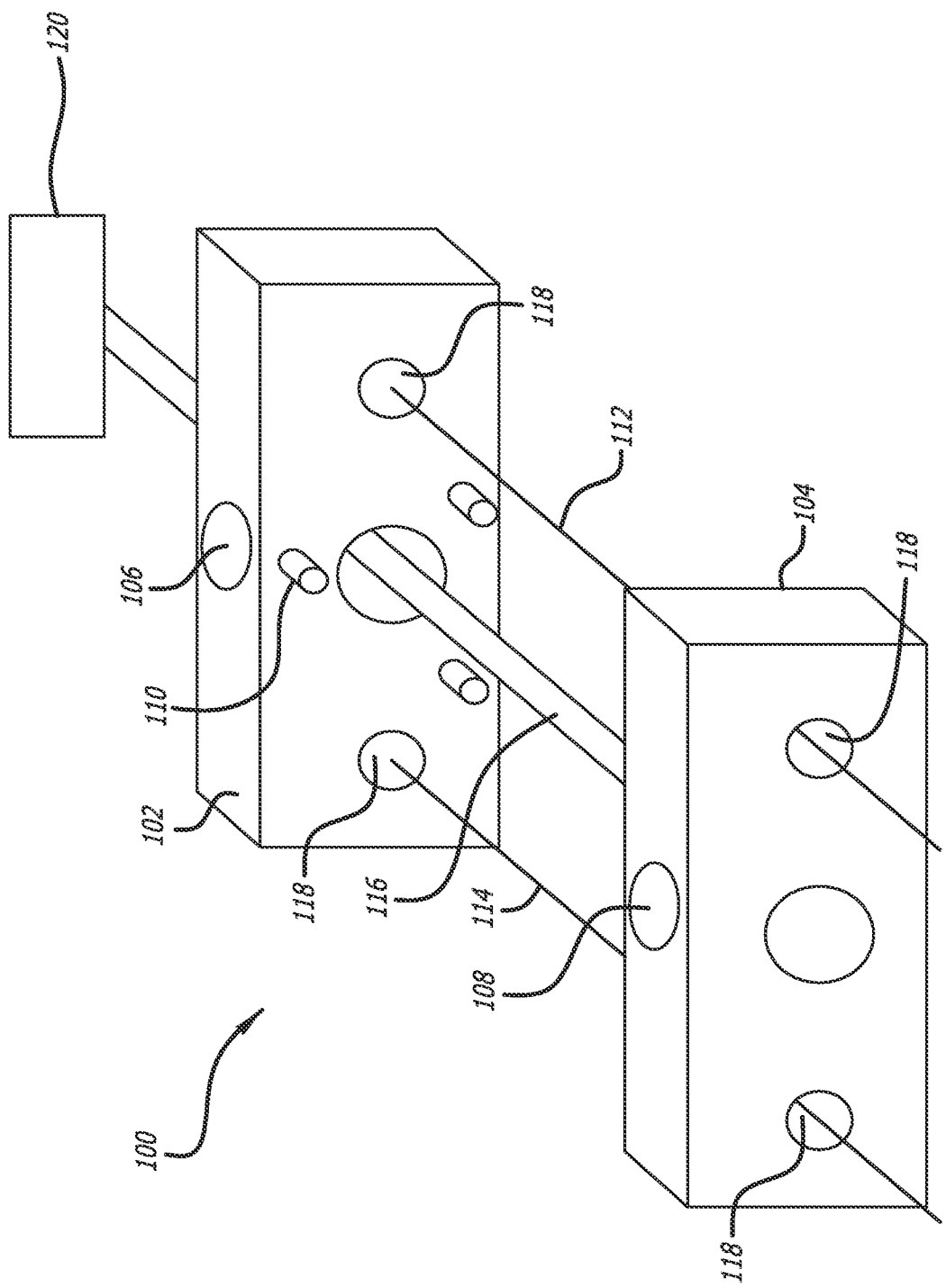
FIG. 1 conceptually illustrates an example of an under-constrained deployable coupler.

Traditional under-constrained deployable system to stow rigid segments compactly but also represent risks not traditionally taken by spacecraft engineers. The last major under-constrained antenna to fly was the highly compact Inflatable Antenna Experiment on STS-77. The antenna almost became tangled during deployment but eventually unraveled itself into a fully deployed position. However, this resulted in engineers avoiding under-constrained inflatable systems for future applications, due to the risk of tangling, even though they have much better stowing efficiencies.

Various embodiments of the invention overcome some problems encountered in legacy systems. In several embodiments, an under-constrained deployable system uses a high strain structure (e.g., high strain composite rods) to guide deployment. Importantly this allows under-constrained deployable systems, in accordance with embodiment of the invention to be configured in a way which should prevent tangling while achieving very high stowage efficiencies and stowage flexibility.

Legacy under-constrained deployable architecture concepts can be complex, expensive, or require advanced control systems. Traditional in-space assembly can be expensive, can require infrastructure (assembly robots) and advanced control systems. Many such legacy systems are not compatible for the SmallSat platform. For instance, many such legacy systems involve robots, advanced attitude control systems and thrusters, and/or rely on precisely controlling electrical and/or magnetic fields which come with their own set of challenges. While under-constrained deployable systems in accordance with embodiments of the invention can have many of the same advantages as other under-constrained systems, it also lacks several disadvantages. A further advantage is that several embodiments do not require any advanced control systems. Control can be built inherently into the mechanical structure. Furthermore, since many embodiments involve first deploying into an over-expanded configuration, these systems can reduce risk of tangling.

Therefore, some of the main advantages offered in the numerous embodiments discussed herein can include: reduced cost as compared to legacy under-constrained while still achieving the same compact storage volume; improved reliability due to reduced risk of tangling; and/or interoperability of the methods between different projects. Several embodiments can have the ability to be stowed in a diverse variety of states, and still reach the desired deployed position. Importantly, this ability may not require any advanced control systems or additional volume for these control systems. Instead, and in accordance with embodiment of the invention, the control is built inherently into the structure mechanically through at least high strain structures (e.g., high strain composite rods). Therefore, several embodiments enable a deployable antenna coming at a lower cost while achieving compact flexible storage volume.

In the past, when missions required a deployable space structure, a new design was often invented each time. This resulted in long development schedules, excessive costs, and even risking the selection of innovative missions when using a new deployable technology. The reason deployable structures are constantly reinvented for each mission is that most deployables are exactly or over-constrained, meaning their motion must be deterministic. Therefore, any time they need to fit in a new spacecraft volume or deploy to a different shape, a new development is required. Under-constrained deployable systems in accordance with embodiments of the invention can be highly adaptable, such that many different systems can utilize the same architectures with the need to reinvent technologies for each deployable system.

Under-Constrained Deployable Systems

In accordance with many embodiments, deployable systems can utilize under-constrained deployable couplers between segments. Turning now to the figures, an example of an under-constrained deployable coupler is conceptually illustrated in FIG. 1. An under-constrained deployable coupler 100 can be made up of a first segment 102 and a second segment 104 that are enabled to deploy by a combination of launch locks 106, 108, locating elements 110, high strain rods 112, 114, and a cable 116. In various embodiments locating elements can serve to locate segments relative to each other as and/or when segments are pulled into contract with each other. Several embodiments include locating elements that are kinematic coupling. Kinematic coupling can take various forms in accordance with embodiments of the invention. At least one suitable type of kinematic mount is described elsewhere herein. In accordance with many embodiments of the invention, kinematic coupling can include kinematic mounts. While the depicted embodiment shows a particular number of each component, it is understood that differing numbers and/or arrangements of components can be used to achieve desirable deployment capabilities. In accordance with many embodiments of the invention the high strain rods can be composite high strain rods. The high strain rods 112, 114 can be arranged within and/or pass through rod passage 118. The rod passages 118 can allow the high strain rods 112, 114 to move through the rod passage 118 such that the high strain rods 112, 114 can translate relative to the first segment 102, and the second segment 104. A cable tensioner 120 (e.g., a winch and/or a reel) can be used to tension and/or reel the cable 116. The cable 116 can be fixedly connected to the segment 104 and/or movably connected to the segment 102 such that the cable 116 can be used to pull the segment 104 into a position adjacent to the segment 102. While under-constrained deployable couplers (also referred to as under-constrained deployable couplers) may be described in connection with particular applications herein, under-constrained deployable couplers can be used in a wide variety of deployable systems including deployable systems not described herein.

In accordance with embodiments of the invention, launch locks can maintain the segments in a stowed configuration during launch vibrations.

In several embodiments, high strain rods can be formed from spring materials such as nitinol, spring steel and/or high strain composites. High strain composite (HSC) rods in several embodiments, can be T300 unidirectional fibers with cyanite ester (EX1515, RS-3C, or BTCy-1A) resin. High strain rods can deploy a deployment joints into an over expanded shape. Deploying deployment joints into an over expanded shape can prevent tangling and/or intersecting of various deployment joints. In accordance with several embodiments of the invention, high strain rods of various spring materials can be used in the place of high strain composite rods. In accordance with embodiments of the invention, high strain rods can be made of any type of spring material including high strain composite, nitinol, spring steel or other suitable spring materials. It is understood that while high strain composite rods may be specified in connection with various embodiments throughout this specification, all such instances of high strain composite rods can be suitably substituted with other high strain rods and/or structures. Suitable materials for high strain rods can include several types of spring material such as nitinol, spring steel, or other materials.

In accordance with embodiments of the invention, two (or more) HSC rods can be used such that each segment aligns in an orientation so as to allow the segments to be pulled together into a desired deployed shape. Proper locating and/or orienting of segments can require two or more HSC rods. This is because using a single rod may allow, the segments to freely spin about their axis relative to each other such that they are not properly located and/or oriented. In several embodiments, a single rod with an aspect ratio greater than 3 can provide alignment benefits similar to those provided by two rods. In many embodiments, the cable can reel the segments together, and when this happens the segments can slide along the high strain composite rods (e.g., with the high strain composite rods moving through rod passages). Cables can provide a reeling force when they are tensioned. Cables can be tensioned by cable tensioning systems (e.g., winches and/or other systems). Several embodiments can utilize tensioning systems of various types in place of cables and cable tensioning systems.

High strain composites can, in accordance with embodiments of the invention, enable deployable architectures to stow compactly. High strain composite rods can store energy and the stored energy can be used to provide deployment energy. Still, HSCs can be subject to creep and viscoelastic effects. This can mean that HSCs can have a hard time deploying to the accuracy required by many systems (e.g., for system operating at 100 GHz or above). Several embodiments of the invention can provide improved accuracy over HSCs in isolation as, the HSCs are taken out of the alignment path when kinematic coupling locate the deployed segments to each other.

In many embodiments, cables can pull the segments together, and/or can provide a preload to nest kinematic coupling. Cables can be tensioned using any of a variety of systems (e.g., a winch). In several embodiments, cables in under-constrained deployable couplers can pull segments together, and/or can provide preloads to nest kinematic coupling. In this way, HSC rods can position the segments to enable the cables to pull the segments together such that kinematic coupling can precisely position the segments for a fully deployed arrangement.

Figure 2:
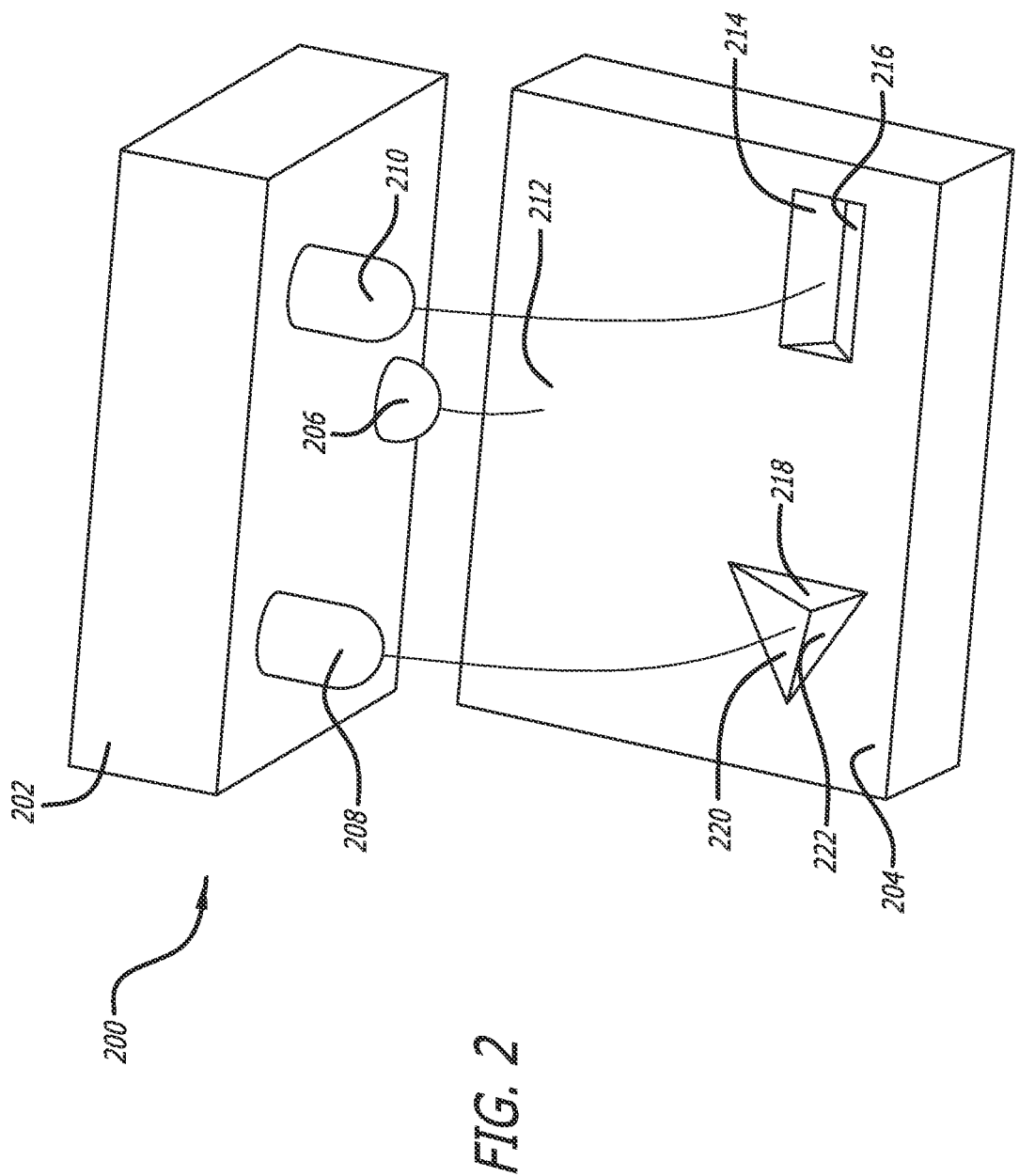
FIG. 2 conceptually illustrates an example of a kinematic coupling.

An example of a kinematic mount is conceptually illustrated in FIG. 2. Kinematic coupling can provide precise positioning when segments are pulled together (e.g., when segments are pulled together by a cable). A kinematic mount 200 can include a first side 202 and a second side 204. The first side 202 can have a first semi-spheroid 206, a second semi-spheroid 208 and a third semi-spheroid 210. The first side 202 is configured to mate with the second side 204. When the first side 202 and the second side 204 are mated: the first semi-spheroid 206 contacts a first constraint 212; the second semi-spheroid 208 contacts a second constraint 214, and a third constraint 216; the third semi-spheroid 210 contacts a fourth constraint 218, a fifth constraint 220 and a sixth constraint 222.

Kinematic coupling can be configured to provide precise positioning of deployable architectures (e.g., such as the under-constrained deployable coupler described in connection with FIG. 1). In several embodiments, kinematic coupling can locate two surfaces in only one possible position relative to each other, by removing the six degrees of freedom through six points of contact (e.g., first constraint 212, second constraint 214, third constraint 216, fourth constraint 218, fifth constraint 220, and sixth constraint 220). Several embodiments of kinematic coupling can utilize 3 semi-spheres and/or 3 V-grooves. In accordance with embodiments of the invention, kinematic coupling can have various means (e.g., geometries) for achieving six points of contact. Kinematic coupling can be built of hardened stainless steel. Several embodiments can include kinematic coupling having average repeatability and/or accuracy of around 10 microns.

This level of repeatability and/or accuracy can be beneficial in many applications. For example, the required accuracy for a radio frequency can be the wavelength divided by twenty. So, an antenna operating at a frequency of 600 GHz can require a deployed accuracy of around λ/20=500 microns/20=25 microns. This means a single joint could operate at more than double this target frequency (e.g., 600 GHz). However, as multiple segments are stacked one up on another, their errors can add, reducing accuracy and resulting in an upward target of 600 GHz. In several embodiments of deployable system (as is further described elsewhere herein) the innermost segment can have 6 under-constrained deployable couplers with kinematic coupling (with 6 constraints each as described elsewhere), intermediate segments can have 3 under-constrained deployable couplers and kinematic coupling, and the outer segments have 1 under-constrained deployable coupler and kinematic coupling.

Application of Under-Constrained Deployable Couplers to Deployable Systems

Figure 3A:
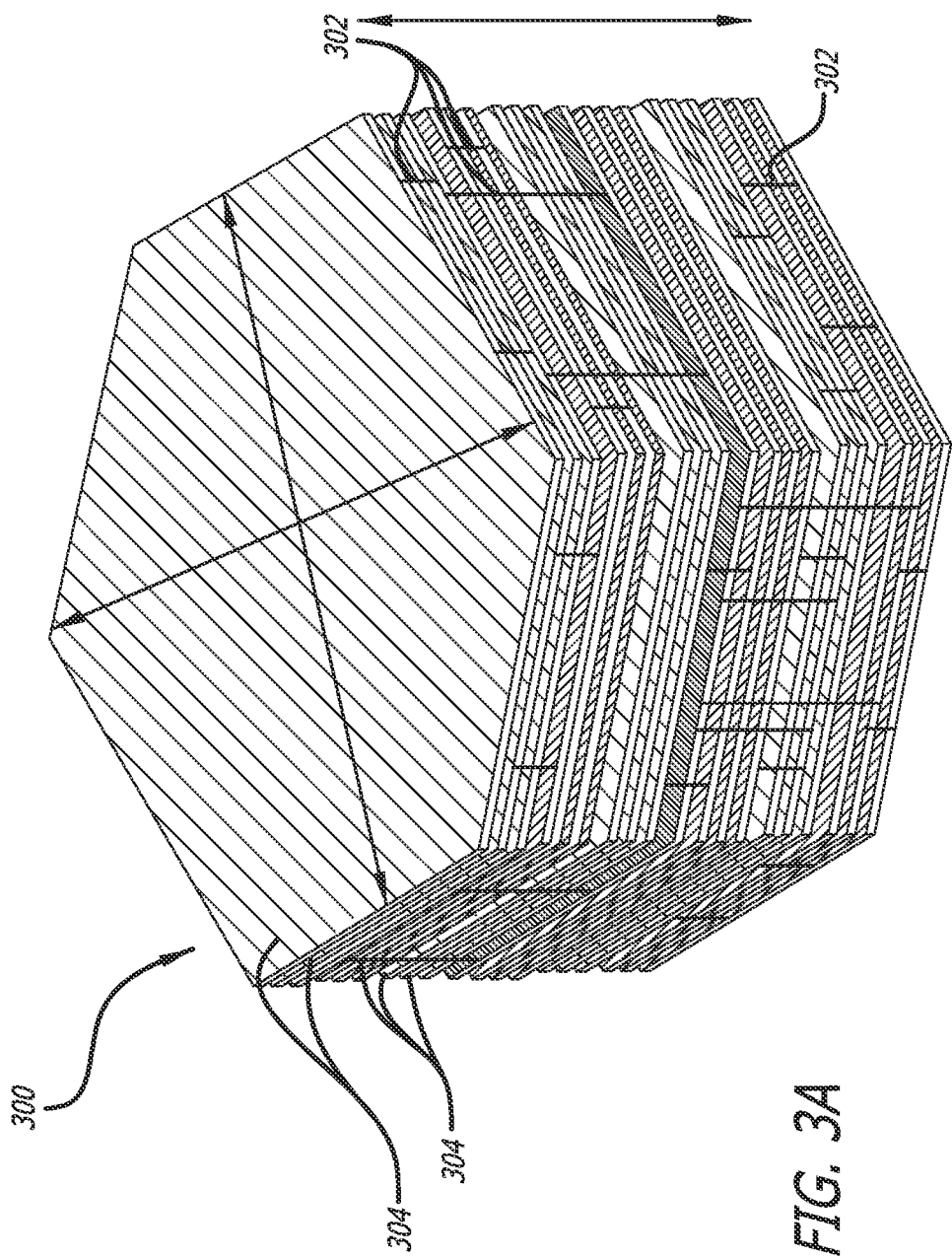
Figure 3C:
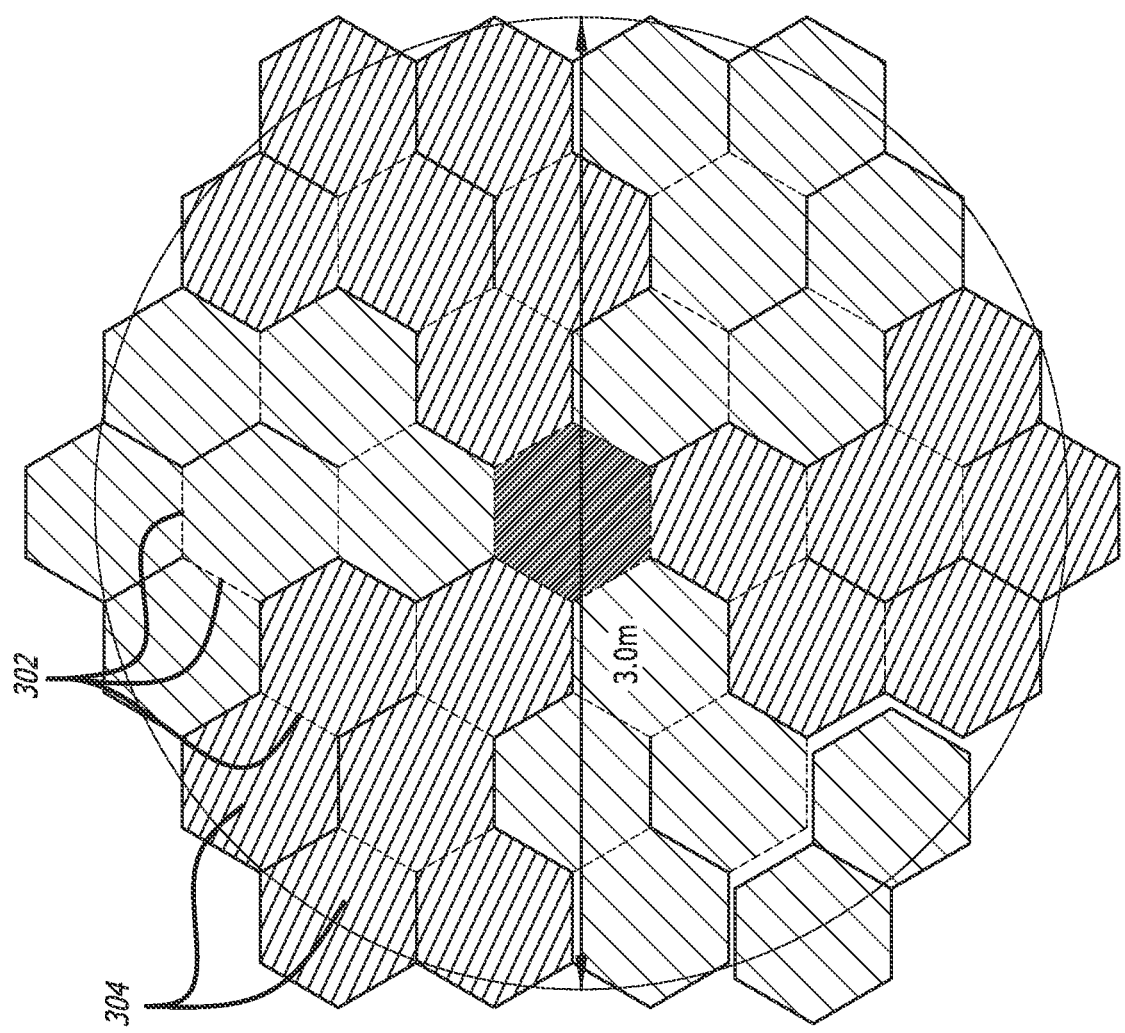

Under-constrained deployable couplers, as discussed herein can be used as a part of deployable systems. In accordance with embodiments of the invention, deployable systems can include various components coupled together via under-constrained deployable couplers. An example of a solid under-constrained multi-frequency (SUM) deployable antenna incorporating under-constrained deployable couplers is conceptually illustrated in FIG. 3A through FIG. 3C. FIG. 3A conceptually illustrates a SUM deployable antenna 300 in a stowed configuration. FIG. 3B conceptually illustrates the SUM deployable antenna 300 in an over-expanded configuration. FIG. 3C conceptually illustrates the SUM deployable antenna 300 in a deployed configuration. The SUM deployable antenna 300 can include one or more under-constrained deployable couplers 302. Each of the under-constrained deployable couplers 302 can couple two segments 304 together. Each segment 304 can be connected to one or more under-constrained deployable couplers 302. In each of the FIGS. 3A through 3B, not all the segments and under-constrained couplers are labelled for clarity.

In the stowed configuration the segments 304 can be stacked and the under-constrained deployable couplers 302 can be deformed so as to allow the stacking of the segments 304. Deformation of the under-constrained deployable couplers can include deformation of one or more HSCs such that energy is stored in the HSCs. After the SUM deployable antenna has been positioned, launch locks can be released in accordance with embodiments of the invention. As is clear from the figures, segments 304 can be hexagonal segments. In accordance with embodiments of the invention, segments can have 3, 4, 5, 6, 7, 8, 9, 10 or another number of segments. In several embodiments, a central segment (e.g., a central hexagonal segment) can have a deployment coupler disposed on each of its (e.g., each of its six) sides.

When the launch locks are released, the HSCs of the deployment couplers 302 can apply a force to the segments 304 to transition the SUM deployable antenna 300 into an over-expanded arrangement as is conceptually illustrated in FIG. 3B. During the expansion of SUM deployable antennas, in accordance with embodiments of the invention, HSCs can release energy while straightening. The energy released can be utilized in the expansion process.

After the SUM deployable antenna 300 has been over-expanded, a cable tensioning system can be used to apply a cable force to the cables of the deployment couplers 302. The cable force can draw the SUM deployable antenna 300 in, from an over extended shape (as shown in FIG. 3B), to the deployed shape (as shown in FIG. 3C). When the cable force draws the SUM deployable antenna 300 in to the deployed shape, the HSCs can slide within high strain rod passages (e.g., high strain rod passages 118) so as to allow kinematic coupling (e.g., kinematic mount 200, and/or other precise kinematic coupling) to mesh and accurately seat the segments together. The cables of the deployment couplers 302 can provide a pre-load to the kinematic coupling. The SUM deployable antenna depicted in FIG. 3 can have a deployed diameter of around 3 meters. The central segment can be connected to other segments on all six sides. In accordance with several embodiments of the invention, there can be 3 under-constrained coupler connections between the outer most segments and the central segment.

In accordance with several embodiments of the invention, the under-constrained SUM deployable antennas can have hexagon segments, high strain composite (HSC) rods used as rough deployment guides, retrieval systems (e.g., cable and/or cable tensioning systems), preloading systems (e.g., cable and/or cable tensioning systems), and/or kinematic coupling. The segments, in accordance with various embodiments of the invention can be rigid, low-coefficient of thermal expansion (CTE) carbon-fiber composite hexagons. The segments can be configured such that they form a parabola when connected. This can, in many embodiments, provide a highly accurate, lightweight stable surface which can be coated with metal to make the segments reflective to optical wavelengths in addition to radio waves.

Many embodiments can include segments that are hexagons that nest neatly on top of each other into a compact volume. In some embodiments, the nested form factor can be around 0.45 m×0.51 m×0.60 m (e.g., under 0.14 m3, or ~33% of an ESPA's volume). Nesting can be enabled by the segments angled such that 10 cm thick edges overlapping each other, like a stacked set of cups, with 1 cm of spacing between each panel surface.

Figure 4:
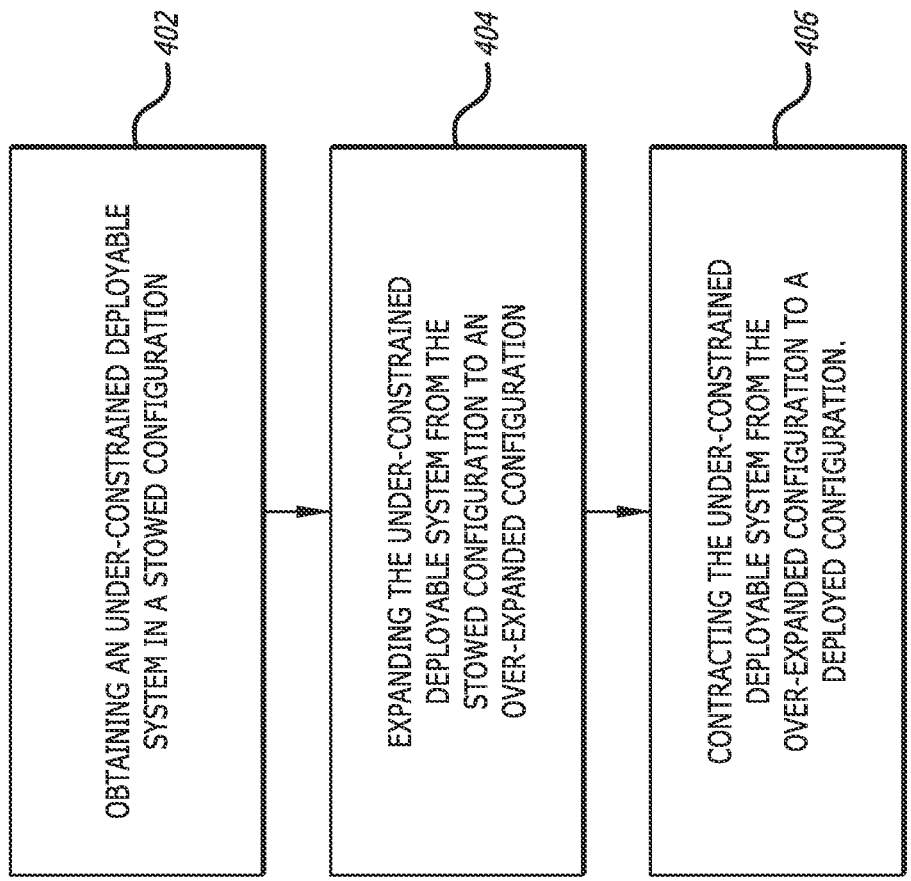
FIG. 4 conceptually illustrates an example process for deploying a SUM deployable antenna.

An example process for deploying an under-constrained SUM deployable antenna is conceptually illustrated in FIG. 4. The process 400 can be a process for deploying an under-constrained SUM deployable antenna. The process 400 can include obtaining (402) an under-constrained SUM deployable antenna in a stowed configuration. In accordance with many embodiments of the invention, an under-constrained SUM deployable antenna can be obtained in space. A stowed under-constrained SUM deployable antenna can have energy stored in bent high strain composite (HSC) rods. The stowed under-constrained SUM deployable antenna can be expanded (404) from a stowed configuration to an over-expanded configuration. Expanding the under-constrained SUM deployable antenna can include releasing energy from HSC rods in under-constrained deployable couplers such that the HSC rods straighten to disperse one or more segments of the under-constrained SUM deployable antenna. The over-expanded under-constrained SUM deployable antenna can be contracted (406) from the over-expanded configuration to a deployed configuration.

In accordance with embodiments of the invention, after launch, launch locks can be released, and the HSC rods can deploy the system into an initial, over-expanded configuration. The over-expanded configuration can be larger than the required final deployed state. The over-expanded configuration can include segments being spaced apart from each other, with the HSC rods extending between under-constrained deployable couplers disposed on the segments. In many embodiments, Two HSC rods can arrange each segment in its proper orientation ensuring each segment (e.g., hexagonal segment) is oriented to be mated to the hexagons nearby. After the system opens, the cables can be retracted, reeling in each of the segments to a final deployed shape. In several embodiments, kinematic coupling can precisely locate each segment relative to each other within 10 microns and are preloaded in place by the cable. The final system, in many embodiments, can have only rigid, kinematically aligned segments in the design, preventing it from being subject to errors due to creep. In several embodiments, the deployment can take about 1 hour.

Under-constrained deployable couplers can be used in various different deployable systems in accordance with various embodiments. Such deployable system can have high stowing efficiencies due to their under-constrained deployment approach and can achieve highly accurate deployments (e.g., within 10 microns) using kinematic coupling, in accordance with some embodiments of the invention. Using under-constrained deployable couplers can enable the segments of a deployable system to deploy in any order. This can greatly increase stowing efficiency and/or can greatly increase the system flexibility with respect to where each segment can be stored on spacecrafts.

In several embodiments, under-constrained deployable couplers can enable under-constrained deployable system that are modular and adaptable. This can be beneficial since it can mean that qualifying one system can qualify the architecture of a myriad of deployables. This one architecture can be used to deploy structures from any stowed configuration into nearly any desired shape. Under-constrained couplers can, in several embodiments, be used for apertures, booms, telescopes and/or solar arrays.

The described architectures for under-constrained deployable systems can be critical for packaging highly capable aperture into a SmallSat form factor. Fitting within the SmallSat form factor reduces cost and weight to allow constellations to be launched (as opposed to the single large Earth science missions which are currently launched and have infrequent revisit times), providing critical time progression data and enabling us to understand the evolution of storms.

The impact of under-constrained deployable systems in accordance with embodiments of the invention extend beyond any specific applications described herein since it is adaptable and flexible. It has the same advantages as in-space assembled architectures only requiring the qualification of one example to enable the use on a number of missions. Further several embodiments can achieve this without the need for a robot. This is beneficial since robots can be hard to fit on SmallSat missions and robots can be prohibitively expensive.

Under-constrained deployable systems, in accordance with embodiments of the invention can increase the effectiveness of in-space assembly. It can reduce the number of components requiring robotic assembly, making assembly more efficient and less complex. Under-constrained deployable system can, not only enables a multi-frequency (sum) deployable aperture for future Earth Science missions (as described in greater detail elsewhere herein) but can also enable a myriad of high accuracy deployables for missions from astrophysics to planetary science. Furthermore, several embodiments can allow a deployable system to be held in unique configurations (e.g., such as an antenna wrapped around the spacecraft). Furthermore, because of the flexible nature of under-constrained deployable couplers as in accordance with many embodiments, the same deployable system can be used to deploy from many configurations into any desired shape.

Solid Under-Constrained Multi-Frequency (SUM) Deployable Antenna

This section aims to provide further explication with regards to the SUM deployable system introduced above. Accurate storm predictions can not only save resources and money, but can also save lives. For predictive weather models, It can be beneficial to measure a storm from space across time over its entire lifecycle, from water vapor to heavy precipitation. To capture the phases of a storm, measurements need to be made at multiple frequencies, with a 25 km resolution. Single satellite approaches that are often taken can only capture one point in time, not the storm's lifecycle. To capture the lifecycle across time a satellite constellation of satellites can be required. Affordable options for satellite constellations include SmallSats.

It has been previously shown that the satellite bus and/or associated instruments can be miniaturized. However, in several systems, an antenna's diameter cannot be shrunk, as this would not provide the resolution (e.g., ground footprint) required. For several embodiments, satellites can require broad multi-frequency (10 GHz to 600 GHz), offset-fed, deployable antenna which expands to multiple times the satellite bus size to create a small enough footprint to inform weather models. Deployable antennas operating above 70 GHz would be useful for meeting these needs. Under-constrained deployable systems, in accordance with embodiments of the invention offer an innovative architecture for deployable structures, meets the identified requirements for deployable antennas operating above 70 GHz. Unlike traditional deployables, which are constrained throughout deployment, under-constrained deployable systems can, in several embodiments, use an under-constrained approach to achieve high stowing efficiencies.

To develop next generation of weather and/or climate models, it may be necessary to acquire global-scale multi-frequency measurements of the time evolution of weather systems. In order to constrain microphysical process rates relevant to various precipitation regimes, observations of cloud properties can be needed over time-frames spanning from tens-of-seconds to tens-of-minutes scales. These measurements can apply to several high-value Earth Science research areas including short-term, severe weather prediction and cloud-climate feedback uncertainty reduction. Several embodiments of the invention can beneficially reduce the cost of deploying satellites to acquire these measurements. The cost reduction can be achieved by reducing the launch form factor required for the generally fixed antenna sizes required.

In accordance with embodiments of the invention, under-constrained deployable systems can be beneficial for many space applications including for miniaturized spacecraft. Various conventional means exist for shrinking electronics, instrument, and spacecraft bus size. However, apertures have a required size, since their required size are governed by physics. Reduced aperture sizes would not provide the required resolution to make updates to weather models, for instance.

Without innovation in the area of deployable, high-gain antennas, the legacy approach can result in one of two undesirable options: 1) A flagship class mission (costing $1 B) is launched to accommodate a full size reflector, which means it makes the desired constellation size unaffordable, reducing the number of data points and therefore science impact or 2) choosing a smaller non-deployable antenna on a SmallSat, which increases the footprint size, greatly reducing ability of the measurements to inform Earth Science models. A high-gain, lightweight deployable (e.g., in accordance with the under-constrained deployable systems described herein) antenna capable of being stowed in a small volume can therefore be useful to make low-cost, miniaturized radar constellations missions capable of addressing this critical observational gap.

A current challenge for antenna design is that existing apertures can generally be either compact but not accurate enough at higher frequencies (beyond 40 GHz) or accurate but large and heavy. For instance, a 3-meter aperture, operating at a frequency of up to 600 GHz can require a surface accuracy of 25 microns.

A solution for a high frequency (up to 240 GHz), wide bandwidth, deployable reflector can beneficially enable low-cost and/or platform-versatile approach. Cloud and precipitation radar payloads can require a 2-meter antenna aperture to capture the evolution of atmospheric processes at high spatial resolution. Microwave radiometers can require an antenna operating from 6 to 200 GHz with a 2-meter diameter conically scanning (spinning) antenna for adequate footprint. Differential Absorption Radar (DAR) instruments can require a 2-meter diameter antenna to focus and detect radar signals from hydrometeors at frequencies spanning from 155 to 175 GHz. Therefore, in accordance with many embodiments of the invention, under-constrained deployable systems can be configured to deploy antenna with diameters of around 2 or more meters. Such a system can include microwave radiometers, conically scanning antenna, differential absorption radars and/or other antenna systems. Various embodiments over solutions to these needs.

In accordance with several embodiments, an under-constrained deployable system can be a solid under-constrained Multi-Frequency (SUM) deployable antenna. A SUM deployable antenna can be a multi-segment, offset-fed parabolic solid deployable antenna system. Such a system can enable large, high-frequency apertures to deploy from a compact volume of stacked segments (e.g., as described elsewhere herein). In many embodiments, an antenna can be 2 meters in diameter, can operate at frequencies between 2 GHz and 240 GHz, and/or can stow in a volume of 0.5× 0.56×0.7 $m^3$.

The core elements of SUM deployable antennas can include aperture segments (semi-hexagons), rough deployment guides (high strain composite (HSC) rods), systems for retrieval/preloading (cable), and/or kinematic coupling. When stowed, segments can stack neatly on top of each other into a compact volume. After launch, launch locks can be activated, releasing the segments. Then the HSC rods can deploy the system into an initial expanded configuration. In accordance with many embodiments, two HSC rods can arrange each segment into a proper orientation, so that the system can be pulled together by cables. After SUM deployable antennas open, cables can retract so as to reel in each of the segments. The reeling in of the segments results in the kinematic coupling providing fine positioning that is more accurate than the positioning provided by just the HSC rods. The cables can provide preloading for the kinematic coupling.

In accordance with many embodiments of the invention, kinematic coupling can precisely locate each segment relative to an adjacent segment other within 20 microns. kinematic coupling can be preloaded in place by the cable to achieve precise locating (e.g., locating within 20 microns). In several embodiments, the overall surface root mean squared (RMS) error of a deployed SUM deployable antenna can be around 60 microns. In many embodiments, SUM deployable antennas can have a final deployed state including only rigid elements so as to avoid errors from creep. Because of its under-constrained deployment configuration, segments forming a portion of a SUM deployable antenna can be stored anywhere on the spacecraft where there is spare volume, maximizing stowed efficiency. The segments, in stowed configurations can be positioned based on only being constrained by the HSC rods connecting the segment, in many embodiments.

Figure 5B:
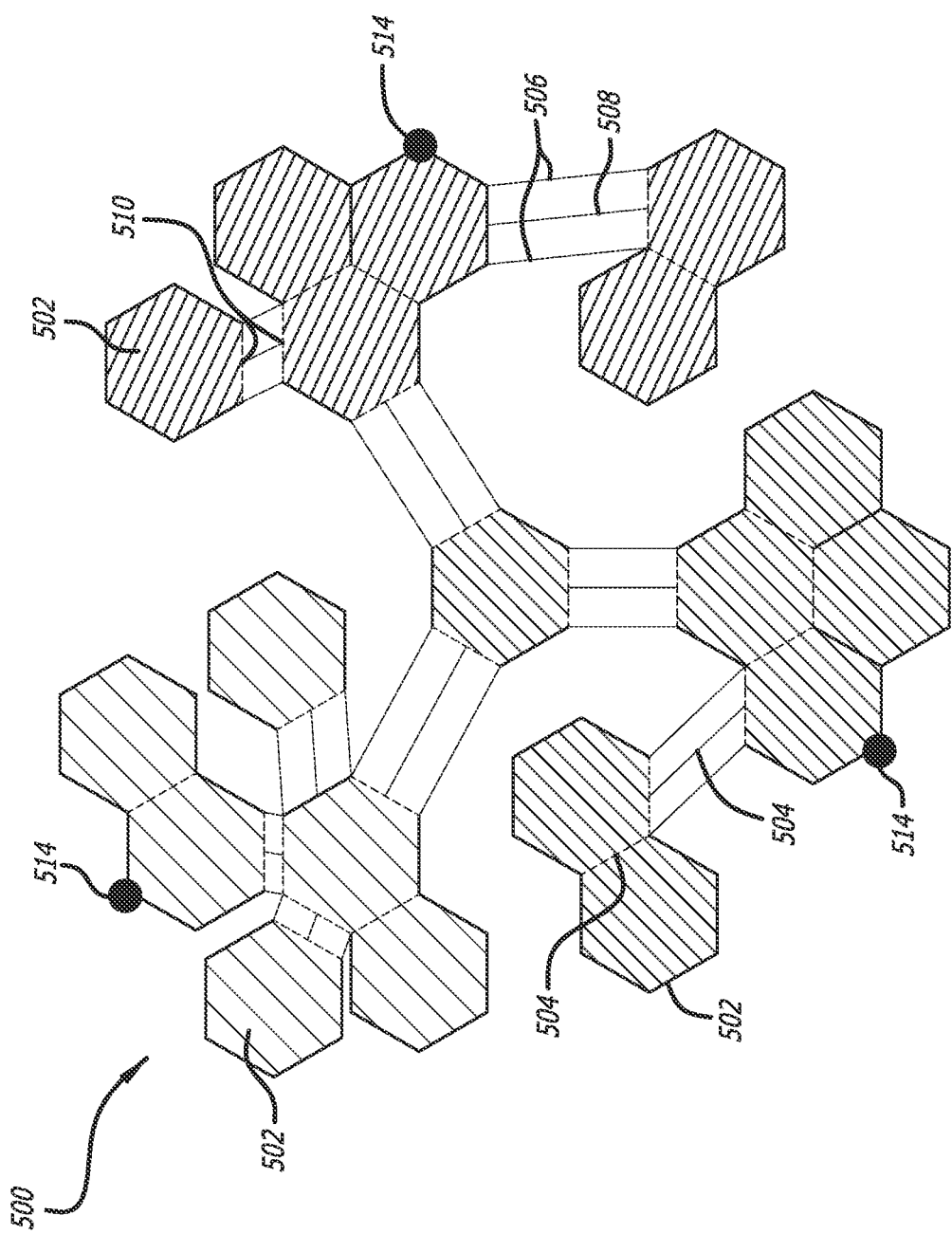
Figure 5C:
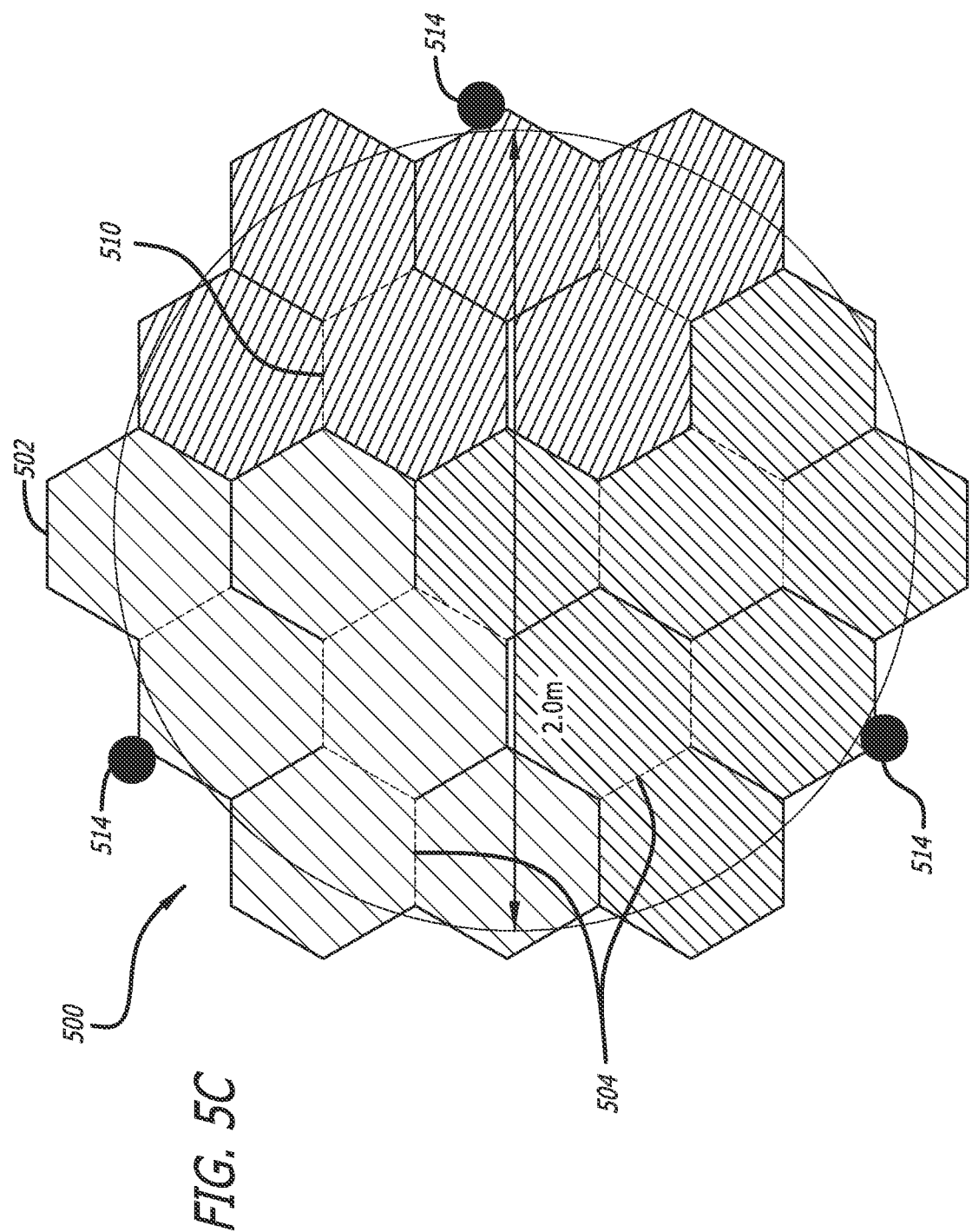

An example solid under-constrained multi-frequency (SUM) deployable antenna is conceptually illustrated in FIG. 5A through 5C. A SUM deployable antenna 500 can be configured to provide a 2-meter antenna. SUM deployable antennas can have high stowing flexibility and efficiency due to its under-constrained deployment approach and can achieve highly accurate deployments (−20 micron) using kinematic coupling. The core components of the SUM deployable antenna 500 can include 19 segments 502. The segments 502 can be hexagonal. Between the hexagonal segments 502 can be under-constrained deployable couplers 504. Under-constrained deployment couplers 504 can include high strain composite (HSC) rods 506. In several embodiments the HSC rods can be used as rough deployment guides, and/or can be used to provide energy to change the configuration of the SUM deployable antenna 500 from a stowed configuration to an over-expanded configuration. The under-constrained deployable couplers can further include a retrieval and preloading system 508. The retrieval and preloading system 508 can be a cable. The cable, in several embodiments, can be tensioned using a winch and/or another system. The retrieval and preloading system 508 can provide preloading for seating the kinematic coupling 510. The under-constrained deployable couplers 504 can, in various aspects, be similar to the under-constrained deployable coupler 100.

FIG. 5A conceptually illustrates the SUM deployable antenna 500 in a stowed configuration. In accordance with several embodiments of the invention, a SUM deployable antenna is a stowed configuration can have outside dimensions of around 0.50 meters by 0.56 meters by 0.7 meters. FIG. 5A further depicts boom segments 512. In accordance with embodiments of the invention, boom segments can deploy into booms 514. Boom segments can be coupled to each other via under-constrained deployable couplers as discussed elsewhere herein. When SUM deployable antennas transition from stowed configurations to deployed configurations boom segments can transition to deployed booms 514.

FIG. 5B conceptually illustrates the SUM deployable antenna 500 in an over expanded configuration. In accordance with embodiments of the invention, over-expanded configurations can be achieved when launch locks on a SUM deployable antenna, in a stowed configuration, are released. When the launch locks are released, HSC rods can release energy to apply an opening force onto the segments thus transitioning the SUM deployable antenna from a stowed configuration to a over-expanded configuration.

FIG. 5C conceptually illustrates the SUM deployable antenna 500 in a final configuration. In a final configuration, an SUM deployable antenna can have the segments in contact. The precise location of contact can be determined by mating of kinematic coupling. In accordance with embodiments of the invention, kinematic coupling can have a first portion on a first side of an under-constrained deployable coupler, and can have a second portion on a second side of an under-constrained deployable coupler. When a kinematic mount is in a configuration corresponding to a deployed SUM deployable antenna, the first portion and second portion of the kinematic mount can be fully seated. Pre-loading of the kinematic mount can be provided by cables. In many embodiments, an SUM deployable antenna can transition from an over-expanded configuration to a deployed configuration when cables are tensioned to draw the segments in towards each other until the kinematic coupling are seated. The HSC rods can slide within apertures when the segments move towards each other.

In accordance with many embodiments of the invention, segments can be rigid, low-coefficient of thermal expansion (CTE) carbon-fiber composite hexagons configured (e.g., shaped) to form a parabola when connected. Accordingly, the sizes of the hexagon segments vary, and not all the segments have equal side lengths. This can be necessary to enable the segments to map to a parabolic surface when fully deployed. In several embodiments, the fully deployed system provides a highly accurate, lightweight stable surface. In some embodiments the segments can be coated with metal when greater conductivity (relative to carbon fiber) is required.

In several embodiments, for manufacturing, the composite segments can be laid up on a tooling. In some embodiments, one large piece of tooling can be used to layup all segments of a deployable system. In accordance with many embodiments, each segment can be individually laid up on a set of molds corresponding one-to-one to the segments.

In accordance with embodiments of the invention, segments can have panel surfaces that are a first thickness (e.g., 1 centimeter) and/or can have a second thickness (e.g., a 10-centimeter-thick) on one or more edges in the locations of kinematic coupling. In many embodiments, when stowed, hexagons can nest neatly on top of each other into a compact volume (e.g., as shown in FIG. 3A). This compact volume can correspond to a configuration of 0.50 meters×0.56 meters×0.70 meters (0.19 m3, or 46% of an ESPA and under 11% of an ESPA Grande volume). In accordance with several embodiments of the invention, the locations of the kinematic coupling can alternate in the stack, such that the kinematic coupling minimally create spacing challenges. In many embodiments, the curvature (e.g., as described above with respect to the parabolic final deployed state of SUM deployable antennae) of each panel means the depth of the panels can vary (e.g., by up to 1 centimeter per panel). when the segments are slightly rotated to enable them to stow more compactly, the variance in curvature can be less than 10%. This can lead to an ideal theoretical (e.g., idealized) stack height of 0.5 meters.

A process for deploying SUM deployable antennas is conceptually illustrated in FIGS. 5A through 5C and is further illustrated in FIG. 4. Prior to, and/or during launch the SUM deployable antenna can be in a stowed configuration. Similarly, to the stowed configurations described with respect to under-constrained deployable systems generally. In the stowed configuration, the segments can assume a variety of relative positions based only on the constraints of the high strain rods. After launch, launch locks can be released. The release of the launch locks can allow the HSC rods to deploy the system into an expanded configuration. The expanded configuration can be larger than the required fully deployed configuration. Two HSC rods can arrange each segment in its proper orientation ensuring each hexagon is oriented to be mated to the hexagons nearby. After the system opens, the cables can be retracted, slowly reeling in each of the hexagons to the final deployed shape. Kinematic coupling precisely locate each hexagon relative to each other within 20 microns and are preloaded in place by the cable. The final system has only rigid, kinematically aligned segments in the kinematic chain, preventing it from being subject to errors due to creep.

Launch locks, in accordance with many embodiments of the invention, maintain the segments in a stowed configuration during launch vibrations. In some embodiments, an aperture may include 19 different segments, but only 1, 2, or 3 launch locks. It can be desirable to have far fewer launch (e.g., fewer launch locks than segments) to increase deployment reliability. Launch lock design, in accordance with embodiments of the invention, can use one launch lock through the entire stack of segments. Several embodiments can use three launch locks, in alternating corners of hexagon segments.

SUM deployable antennas can use developments from the field of high strain composites. In several embodiments, two HSC rods can guide the SUM deployable antenna into an over-expanded shape. Additionally, tangling and/or intersection of HSC rods can be reduced based on using at least two HSC rods for each under-constrained deployable coupler. It can be important to use two (or more) HSC rods for coupling segments, as this aligns the segments in a single defined orientation relative to each other. In this way, the orientation between coupled segments is correct and the segments can be pulled together into the deployed shape. When the cables reel segment together, in accordance with many embodiments of the invention, the segments can slide along the high strain composite rods, and the high strain composite can then nest into each other and/or slide relative to the segments.

Once coarsely aligned (e.g., by HSC rods), segments can be pulled together by cable (e.g., cables that form part of under-constrained deployable couplers). In several embodiments, cables can provide preload to nest the kinematic coupling on coupled segments. In many embodiments, cables can have a constant force spring at the ends to enable compliance. This can be important for the cables to maintain tension over multiple environments and over long durations.

Several embodiments can utilize cables in combination with a secondary preloading approach, where the secondary preloading approach uses a separate latching mechanism. This can, in numerous embodiments, improve accuracy over using cables alone.

As described above with respect to under-constrained deployable couplers, precise positioning can be performed by kinematic coupling (e.g., the kinematic mount shown in FIG. 2). Kinematic coupling, in many embodiments, can be capable of locating two surfaces in a single possible position relative to each other, by exactly removing the 6 degrees of freedom through 6 points of contact. In accordance with embodiments of the invention, kinematic coupling (e.g., kinematic coupling utilizing 3 spheres and 3 V-grooves built of hardened stainless steel) can have an average repeatability of 10 microns.

In some embodiments, a SUM deployable antenna can have a maximum operating frequency of 240 GHz. A maximum operating frequency of 240 GHz can correspond to requiring a minimum deployed accuracy 63 microns surface RMS requirement. Based on this 63-micron requirement, 34 microns can allocated to the joints, 3 microns to coefficient of thermal expansion (CTE), 20 microns to layup, and 6 microns to the reflector assembly.

Accordingly, in several embodiments, the deployment accuracy of each joint can be designed to be 20 microns. When accounting for a real RMS, the accuracies due to deployment can account for around 34 microns RMS. Center segments can have no error due to joints, and the next six segments (e.g., those segments directly coupled to the center segment) can have a 20-micron error. An outer set of 12 segments (attached to the next six segments) can have an error of 40 microns. And so, the remaining 29 microns can be allocated to layup, assembly and CTE errors. For a parabolic surface, especially one made of low CTE carbon fiber, CTE typically has minimal effects on surface RMS. While the entire parabola may shrink or grow slightly, it will have the same parabolic shape. Therefore, we have allocated just 3 microns to CTE errors for any potential non-linear effects. With regards to machining, composites can have an accuracy off the mold of 20 microns, when the mold is built accurately enough. In addition to an accurate parabolic mold to meet the proposed tolerances, the parabolic composite components (e.g., the segments of the under-constrained deployable system and/or the hexagonal segments of the SUM deployable antenna) can, in several embodiments, have a quasi-isotropic lay-up configuration with high stiffness unidirectional carbon fibers and/or space graded resin (such as M55j/RS-3C Toray prepreg system).

Assembly of the segments can use 6 microns of the error budget. This assembly precision can, in accordance with several embodiments be achieved by liquid shimming the parts in place on precise tooling. Further, it is possible that if the right liquid shimming tooling can be designed, it can accommodate and correct for any errors from the layup, and thus could result in an even more accurate surface, further reducing the 20-micron error from mold accuracy.

In addition to the achieving an accurate parabolic shape for the SUM antenna, is can be necessary for a boom to meet boresight requirements (e.g., rigid body errors), which are separate from the surface RMS.

The boresight requirement for an offset-fed reflector operating at these frequencies can be approximately 300-microns and 3-milliradians of alignment. This drives the boom accuracy requirements. In accordance with many embodiments of the invention, several boom segments with under-constrained deployable couplers can deploy a boom to well within this 300-micron accuracy using the approaches described herein.

In many embodiments, a SUM deployable antenna can be attached to a spacecraft by a boom. SUM deployable antennas can be used in conjunction with traditionally deployed booms and/or with under-constrained deployable coupler enabled booms. Under-constrained deployable coupler enabled booms can utilize under-constrained coupled for deployment of boom segments from a stowed configuration, to an expanded configuration, and finally to a deployed configuration. In several embodiments, a boom for supporting an antenna can include a number of boom segments (e.g., 4 boom segments) connected using under-constrained deployable couplers (as described elsewhere herein) such that the boom segments can be cable-actuated and connected to each other using kinematic coupling.

Further Applications of Under-Constrained Deployable Systems

Under-constrained deployable systems in accordance with embodiments of the invention can be used in the design of many different deployable space structures, such as booms, antennas, telescopes, and solar arrays. An example of a high accuracy long deployable boom is conceptually illustrated in FIGS. 6A and 6B. A high accuracy long deployable boom 600 can have two or more boom segments 602. The boom segments can be connected to a body element 604. The boom segments can be connected via under-constrained deployable couplers 606. The under-constrained deployable couplers can connect boom portions that are adjacent in the deployed boom. FIG. 6A illustrates the boom 600 in a stowed configuration. FIG. 6B illustrates the boom 600 in a deployed configuration. The boom 600 can transition from a stowed configuration to a deployed configuration by releasing launch locks, allowing the system to assume and over-expanded configuration, and/or reeling the system components together using cables with guidance provided by HSC rods. In several embodiments, high accuracy long deployable booms can have a length of around 7 m with an accuracy of 140 microns.

An example of an under-constrained deployable telescope is conceptually illustrated in FIGS. 7A and 7B. An under-constrained deployable telescope 700 can have two or more boom segments 702, and three or more aperture segments 704. The boom segments 702 and the aperture segment 704 can be connected together with a set of under-constrained deployable couplers 706. Furthermore, the segments and couplers can be mounted to a body element 708. FIG. 7A illustrates the telescope 700 in a stowed configuration. FIG. 7B illustrates the telescope 700 in a deployed configuration. The telescope 700 can transition from a stowed configuration to a deployed configuration by releasing launch locks, allowing the system to assume and over-expanded configuration, and/or reeling the system components together using cables with guidance provided by HSC rods.

High Strain and Tension System can be Combined into One Element

Figure 8:
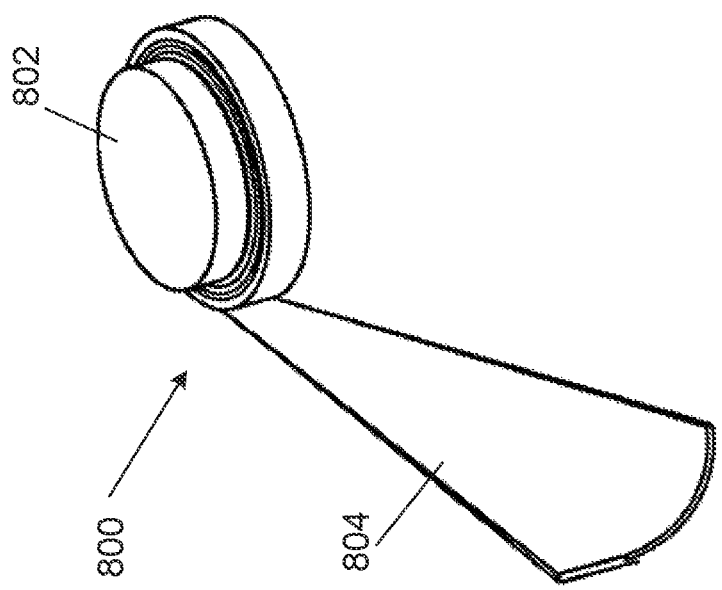
FIG. 8 conceptually illustrates an example of a lenticular high strain rod.

In several embodiments, high strain rods and tension systems can be combined into a single element such that the high strain rods can be retracted. In various embodiments, high strain rods can be lenticular structures (e.g., like a tape measure). Lenticular high strain rods can be rolled up after over-expansion to tension the system into assuming a final deployed configuration. In many embodiments, rods can be telescopic, such that after they deploy, they can be telescopic and capable of reducing their length, thereby bringing the segments together. An example of a lenticular high strain rod is conceptually illustrated in FIG. 8. A lenticular high strain rod 800 can have a reel component 802. Wrapped around and/or extending from the reel can be a lenticular rod component 804. Lenticular high strain rods can, in various embodiments, be incorporated into under-constrained deployable couplers. Lenticular high strain rods can be a tensioning system and a high strain deployment system in several embodiments. In this way, lenticular high strain rods can function to over-expand a deployable system, and can also serve to tension and reel the deployable system into a final configuration. In accordance with several embodiments, various other types of high strain rods (e.g., telescopic high strain rods) can be used in ways similar to lenticular high strain rods.

While specific processes and/or systems for under-constrained deployable systems are described above, any of a variety of processes and/or systems can be utilized for under-constrained deployable systems as appropriate to the requirements of specific applications. In certain embodiments, steps and/or components may be performed and/or configured in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to under-constrained deployable systems, the techniques disclosed herein may be used in any type of deployable system. The techniques disclosed herein may be used within any of the under-constrained deployable systems, under-constrained deployable couplers, solid under-constrained multifrequency deployable antenna, high accuracy under-constrained deployable boom, under-constrained deployable telescope and/or other devices and/or systems as described herein.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. An under-constrained deployment system for deploying structures in space, the deployment system comprising:
   a first segment;
   a second segment coupled to the first segment by a high strain structure, wherein the high strain structure is bent to store deployment energy in a stowed configuration;
   a tensioning system further coupling the first segment to the second segment, wherein the tensioning systems is capable of actuating to translate the first segment along the high strain structure such that the deployment system is transitioned from an expanded configuration to an assembled configuration; and
   a locating element;
   wherein, in the stowed configuration, the first segment and second segment have a first relative position;
   wherein, in the expanded configuration, the high strain structure is straightened relative to the stowed configuration, and wherein the expanded configuration is achieved using energy released as the high strain structure transitions from bent to straightened, and wherein the first segment and the second segment have a second relative position in the expanded configuration; and
   wherein the assembled configuration corresponds to the first segment and the second segment having a third relative position, the third relative position constrained by contact between a first portion of the locating element disposed on the first segment and a second portion of locating element disposed on the second segment.

2. The under-constrained deployment system of claim 1, wherein the locating element is a kinematic coupling.

3. The under-constrained deployment system of claim 1, wherein the high strain structure has an aspect ratio greater than 3.

4. The under-constrained deployment system of claim 1, wherein the high strain structure is two high strain rods.

5. The under-constrained deployment system of claim 1, wherein a cable is centrally disposed between a first high strain composite rod and a second high strain composite rod.

6. The under-constrained deployment system of claim 1, wherein the locating element provides repeatability within 10 microns.

7. The under-constrained deployment system of claim 1 wherein the tensioning system comprises a cable.

8. The under-constrained deployment system of claim 1 wherein the tensioning system is the high strain structure, and wherein the high strain structure can also be retracted to bring the first segment and second segment together.

9. The under-constrained deployment system of claim 1, further comprising a third segment coupled to the first segment by a high strain structure and a cable.

10. The under-constrained deployment system of claim 1, wherein the first segment is an aperture segment.

11. The under-constrained deployment system of claim 1, wherein the first segment is a boom segment.

12. A solid under-constrained multi-frequency (SUM) deployable antenna, the SUM deployable antenna comprising:
    a deployable antenna comprising:
       a first segment; and
       a second segment that is coupled to the first segment by an under-constrained deployable coupler, wherein the under-constrained deployable coupler comprises:
          a high strain deformable structure connected on a first end to the first segment, and on a second end to the second segment, wherein when the deployable antenna is in a stowed configuration, strain energy is stored in the high strain deformable structure;
          a tensioning system; and
          a kinematic mount with a first side disposed on the first segment and a second side disposed on the second segment;
       wherein, in a deployed configuration, the deployable antenna has an outer diameter greater than 2 meters.

13. The solid under-constrained multi-frequency (SUM) deployable antenna of claim 12, wherein the first segment is hexagonal.

14. The solid under-constrained multi-frequency (SUM) deployable antenna of claim 12, wherein the high strain deformable structure comprises two generally parallel high strain composite rods.

15. The solid under-constrained multi-frequency (SUM) deployable antenna of claim 12, wherein the high strain deformable structure can translate relative to the first segment and relative to the second segment.

16. The solid under-constrained multi-frequency (SUM) deployable antenna of claim 12, wherein the tensioning system comprises a cable and a cable tensioning system.

17. The solid under-constrained multi-frequency (SUM) deployable antenna of claim 12, wherein the deployable antenna has an outer diameter of around 3 meters.

18. The solid under-constrained multi-frequency (SUM) deployable antenna of claim 12, wherein the stored strain energy is sufficient to transition the deployable antenna from the stowed configuration to an over-expanded configuration.

19. The solid under-constrained multi-frequency (SUM) deployable antenna of claim 12, wherein the tensioning system is capable of transitioning the antenna from an over-expanded configuration to the deployed configuration.

20. An under-constrained deployable coupler, the deployable coupler comprising:
    a first side with a first passage, a second passage;
    a second side with a third passage, and a fourth passage;
    a first high strain rod movably coupled to the first passage and the second passage;
    a second high strain rod movably coupled to the third passage and the fourth passage;
    a cable coupled to the first side and the second side;
    a first portion of a locating element disposed on the first side; and
    a second portion the locating element disposed on the second side, wherein the first portion of the locating element and the second portion of the locating element are configured to mechanically interface.

21. The under-constrained deployable coupler of claim 20, wherein the first and second high strain rods are high strain composite rods.

22. The under-constrained deployable coupler of claim 20, wherein the first portion of the locating element and the second portion of the locating element are configured to mechanically interface when pre-loaded by the cable.

23. The under-constrained deployable coupler of claim 20, wherein the first and second high strain rods are substantially parallel.

24. The under-constrained deployable coupler of claim 20, wherein the first side is disposed on a first segment and the second side is disposed on a second segment, and wherein the first and second segments are configured to form a parabola when the first portion of the locating element and the second portion of the locating element mechanically interface.

25. The under-constrained deployable coupler of claim 20, wherein the first side is disposed on a first segment and the second side is disposed on a second segment, and wherein the first and second segments are configured to form a boom when the first portion of the locating element and the second portion of the locating element mechanically interface.

\* \* \* \* \*